(12) United States Patent
Nakamura

(10) Patent No.: US 7,018,480 B2
(45) Date of Patent: Mar. 28, 2006

(54) MANUFACTURING METHOD AND APPARATUS OF FIBER REINFORCED COMPOSITE MEMBER

(75) Inventor: Takeshi Nakamura, Tokorozawa (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 219 days.

(21) Appl. No.: 10/382,913

(22) Filed: Mar. 7, 2003

(65) Prior Publication Data

US 2003/0154582 A1  Aug. 21, 2003

Related U.S. Application Data

(62) Division of application No. 09/765,688, filed on Jan. 22, 2001, now Pat. No. 6,610,227.

(30) Foreign Application Priority Data

Jan. 25, 2000  (JP)  .............................. 2000-15248

(51) Int. Cl.
*B29C 33/12* (2006.01)

(52) U.S. Cl. .................. 118/728; 249/83; 249/184; 264/261; 264/274; 425/123; 425/124

(58) Field of Classification Search .............. 249/83, 249/184; 425/123, 124; 264/261, 274; 118/728
See application file for complete search history.

(56) References Cited

U.S. PATENT DOCUMENTS

| | | | |
|---|---|---|---|
| 1,598,059 A * | 8/1926 | Cykler | |
| 2,028,040 A | 1/1936 | Benge | |
| 3,795,039 A * | 3/1974 | Earl | 29/592.1 |
| 3,991,248 A | 11/1976 | Bauer | |
| 4,155,966 A * | 5/1979 | Tschanz et al. | 264/230 |
| 4,213,932 A * | 7/1980 | Young | 264/236 |
| 4,263,249 A * | 4/1981 | Mayumi et al. | 264/334 |
| 4,423,540 A * | 1/1984 | Hishida | 29/460 |
| 4,580,524 A * | 4/1986 | Lackey et al. | 118/725 |
| 4,581,806 A * | 4/1986 | Minoshima | 29/460 |
| 4,675,965 A * | 6/1987 | Offringa et al. | 264/261 |
| 4,724,111 A * | 2/1988 | Iwata et al. | 264/155 |
| 4,824,711 A | 4/1989 | Cagliostro et al. | |
| 5,076,054 A * | 12/1991 | Akimune et al. | 60/272 |
| 5,288,354 A | 2/1994 | Harris et al. | |
| 5,585,165 A | 12/1996 | Kennedy et al. | |
| 5,955,194 A | 9/1999 | Campbell | |
| 6,139,916 A | 10/2000 | Saruhan-Brings et al. | |

FOREIGN PATENT DOCUMENTS

| | | |
|---|---|---|
| EP | 0399548 A2 | 11/1990 |
| EP | 0 417 676 A2 | 3/1991 |
| EP | 0 417 676 A3 | 3/1991 |
| EP | 0 1 024 121 A2 | 8/2000 |
| JP | 2000-219576 A | 8/2000 |

* cited by examiner

*Primary Examiner*—Robert B. Davis
(74) *Attorney, Agent, or Firm*—Griffin & Szipl, P.C.

(57) ABSTRACT

There is disclosed a method of forming a fabric 1 on the surface of a mandrel 10, infiltrating the formed fabric with matrix, and leaving portions 12a, 12b of the mandrel as integral with the fabric and removing the mandrel before the fabric adheres to the mandrel by matrix infiltration. Subsequently, a remaining portion of the mandrel is used as a reference surface and machining is performed. Without possibility of adhesion to the mandrel and resulting breakage, machining bases (axial center and reference surface) during machining can accurately be provided, and this can largely enhance machining precision and yield of a final product.

3 Claims, 5 Drawing Sheets

MANUFACTURING METHOD AND APPARATUS OF FIBER REINFORCED COMPOSITE MEMBER

This application is a divisional of U.S. patent application Ser. No. 09/765,688, filed Jan. 22, 2001, and now U.S. Pat. No. 6,610,227, which claims priority on Japanese Patent Application No. 15248/2000, filed Jan. 25, 2000. The entire disclosures of the above patent applications are hereby incorporated by reference.

BACKGROUND OF THE INVENTION

1. Field of the Invention

The present invention relates to a manufacturing method and apparatus of a ceramic matrix composite member and carbon-based composite material which can accurately be provided with machining bases (axial center and reference surface) during machining.

2. Description of the Related Art

In order to raise the performance of a rocket engine using $NTO/N_2H_4$, NTO/MMH, and the like as impelling agents, heat-resistant temperature of a combustor (thrust chamber) is requested to be raised. For this purpose, a coated niobium alloy having a heat-resistant temperature of about 1500° C. has heretofore been used as a chamber material for many rocket engines. However, this material is disadvantageously heavy because of its high density, low in high-temperature strength, and has a short coating life.

On the other hand, since ceramic is high in heat resisting properties but disadvantageously brittle, a ceramic matrix composite member (hereinafter abbreviated as CMC) has been developed by reinforcing the ceramic with ceramic fiber. Specifically, a ceramic matrix composite member (CMC) comprises ceramic fiber and ceramic matrix. Additionally, in general the CMC is indicated as ceramic fiber/ceramic matrix by its material (e.g., when both are formed of SiC, SiC/SiC is indicated).

Since CMC is light-weight and high in high-temperature strength, it is a remarkably prospective material for the combustor (thrust chamber) of the rocket engine, further a fuel piping in a high-temperature section, a turbine vane of a jet engine, a combustor, an after-burner component, and the like.

However, the conventional CMC cannot hold its hermetic properties and is disadvantageously low in resistance to thermal shock. Specifically, for the conventional CMC, after a predetermined shape is formed of ceramic fibers, a matrix is formed in a gap between the fibers in so-called chemical vapor infiltration (CVI) treatment. However, a problem is that it takes an impractically long time (e.g., one year or more) to completely fill the gap between the fibers by the CVI. Moreover, in a high-temperature test or the like of the conventional CMC formed as described above, when a severe thermal shock (e.g., temperature difference of 900° C. or more) acts, the strength is drastically lowered, and the CMC can hardly be reused.

Therefore, the conventional ceramic matrix composite member (CMC) cannot substantially be used in the combustor (thrust chamber), the fuel piping or another component requiring the hermetic properties and resistance to thermal shock.

In order to solve the aforementioned problem, the present inventor et al. have created and filed a patent application, "Ceramic-based Composite Member and its Manufacturing Method" (Japanese Patent Application No. 19416/1999, not laid yet). The Ceramic-based Composite Member can largely enhance the hermetic properties and thermal shock resistance and which can be for practical use in the thrust chamber, and the like. In the invention, as schematically shown in FIG. 1, after subjecting the surface of a shaped fabric to CVI treatment to form an SiC matrix layer, PIP treatment is performed to infiltrate and calcine a gap of the matrix layer with an organic silicon polymer as a base.

In a manufacture process shown in FIG. 1, from a braiding process (1) to a CVI process (3), a jig or mandrel, for example, of carbon or the like is used to form a fabric 1 in a periphery and subsequently, the CVI treatment is performed. Since matrix is formed in the gap of the fabric 1 by the CVI treatment and a shape is held, in this stage, the mandrel is detached, and subsequent PIP treatment (4) and machining (5) are performed in a conventional art. Additionally, in the braiding process, as schematically shown in FIG. 2, for example, braid weave is used in which a braided thread is alternately and obliquely woven into a middle thread.

However, a ceramic matrix composite member 2 subjected to the CVI treatment and PIP treatment after the braiding process (e.g., braid weave) is large in surface concave/convex, and there is a problem that a machining basis cannot be established. Specifically, as schematically shown in FIG. 3, since the concave/convex of the surface of a semi-finished product (ceramic matrix composite member 2) is large, a machining reference point/surface cannot precisely be defined, and for example, by determining an axial center in such a manner that deflection of rotation around Z—Z axis of FIG. 3 is minimized, and further determining, for example, a minimum diameter position in this situation, the position is set as a positioning basis of an axial direction. Therefore, in such method, it is impossible to accurately determine the axial center or the reference surface of the axial direction, and as a result, a defect of a cut place of the axial direction, non-uniformity of a product plate thickness by one-side contact machining (cut of reinforced fiber) and other machining precision defects are caused.

Moreover, in order to solve the problem, it is preferable to attach the mandrel even during machining, but in this case, the product adheres to the mandrel by the matrix in the CVI or PIP treatment, it becomes difficult or impossible to detach the product, and there is a problem that product breakage rate increases and product yields are remarkably lowered.

SUMMARY OF THE INVENTION

The present invention has been developed to solve the problem. Specifically, an object of the present invention is to provide a manufacturing method and apparatus of a fiber reinforced composite member in which machining bases (axial center and reference surface) during machining can accurately be provided without possibility of adhesion to a mandrel and resulting breakage, so that machining precision and yield of a final product can largely be improved.

According to the present invention, there is provided a manufacturing method of a fiber reinforced composite member comprising steps of: forming a fabric on the surface of a mandrel; infiltrating the formed fabric with matrix; and leaving a part of the mandrel which is integral with the fabric and removing the mandrel.

According to a preferred embodiment, the left part of the mandrel which is integral with the fabric is used as a reference surface to perform machining. Moreover, the fabric is formed to be longer than a product dimension.

According to the method of the present invention, since a part of the mandrel is left as integral with the fabric and the mandrel is detached, a product portion failing to contact the left mandrel can sufficiently be infiltrated with the matrix and formed similarly as a conventional art. Moreover, since a part of the mandrel is left in a semi-finished product (fiber reinforced composite member) after matrix infiltration treatment, by using the part of the mandrel as the machining bases (axial center and reference surface) during machining, an axial direction position and axial center determined on the mandrel can be held constant. Therefore, by setting the reference surface beforehand to be a smooth surface, even with a large concave/convex of the surface of the semi-finished product, the machining basis can accurately be provided, non-uniformity of a machined plate thickness can be eliminated, shape precision is improved, and further strength deterioration by cutting of fiber can be inhibited.

Moreover, according to the present invention, there is provided a manufacturing apparatus of a fiber reinforced composite member for forming a fabric on the surface of a mandrel, and infiltrating the formed fabric with matrix, wherein the mandrel is formed to be longer than a product dimension of a fiber reinforced composite member.

According to the preferred embodiment of the present invention, a portion of the mandrel protruding from the product dimension of the fiber reinforced composite member has a portion whose diameter increases toward an end, and the diameter increasing portion can be separated into an annular portion having a diameter larger than an outer diameter of a product dimension end portion and a remaining portion in a constitution.

By the constitution, the annular portion having the diameter larger than the outer diameter of the product dimension end portion is left as integral with the fabric, and the remaining portion can be removed.

Moreover, it is preferable to form a groove or a protrusion interlocking with the fabric on the surface of the annular portion in such a manner that when the part of the mandrel forming the product portion is removed, the mandrel left as integral with the fabric fails to move on the fabric. By this constitution, connection/integration of the annular portion with the fiber reinforced composite member is reinforced, and displacement of the annular portion during removing of the mandrel can be prevented.

Other objects and advantageous characteristics of the present invention will be apparent from the following description with reference to the accompanying drawings.

DETAILED DESCRIPTION OF THE PREFERRED EMBODIMENTS

A preferred embodiment will be described hereinafter with reference to the drawings.

Figure 1:
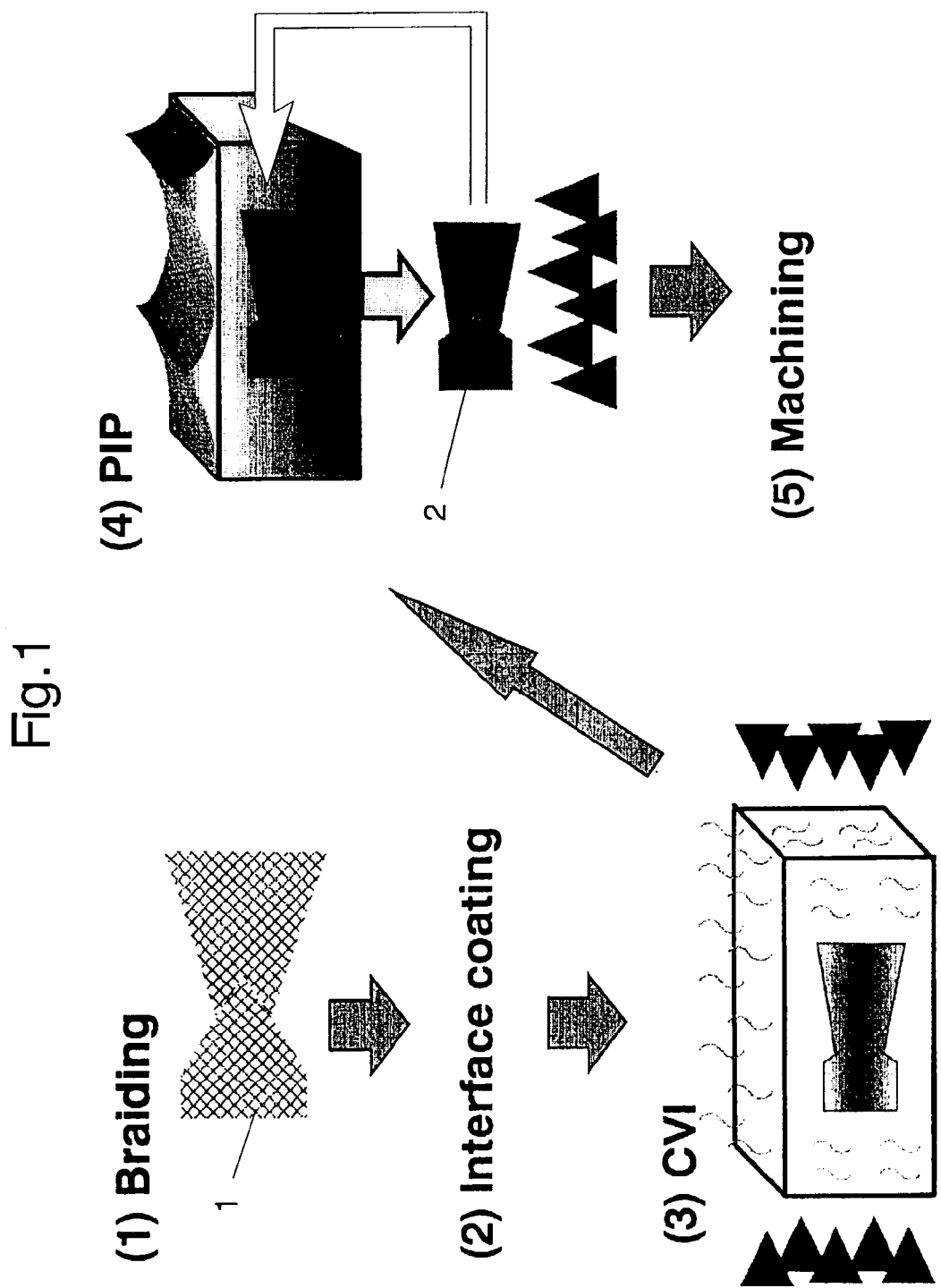
FIG. 1 is a schematic view of a CMC manufacturing method to which the present invention is applied.
Figure 2:
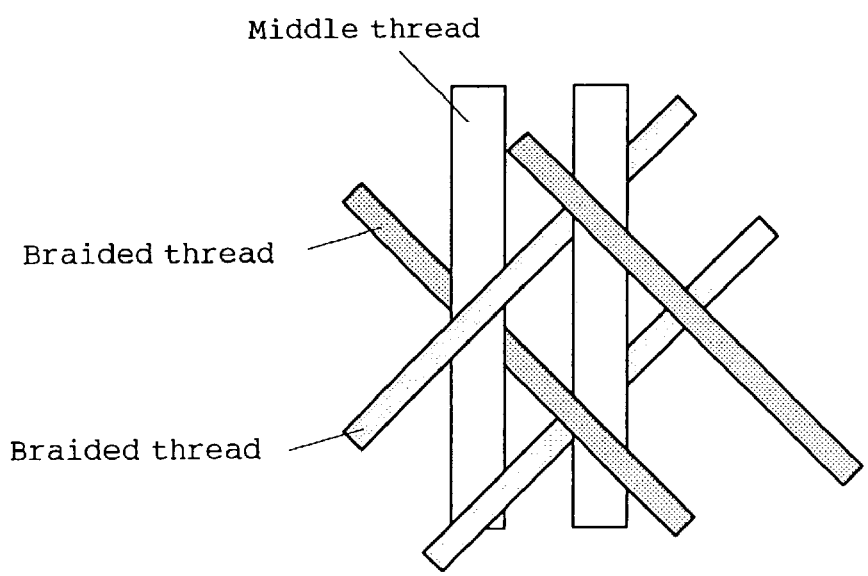
FIG. 2 is a schematic view of a braid weave.
Figure 3:
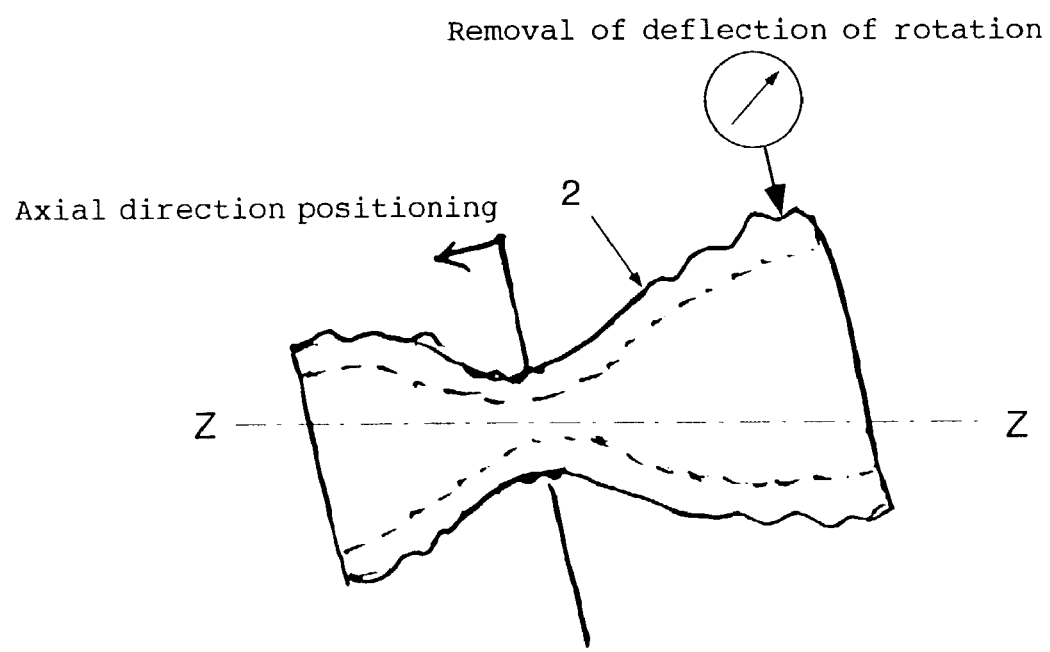
FIG. 3 is a schematic view of a machining basis in a conventional manufacturing method.
Figure 4:
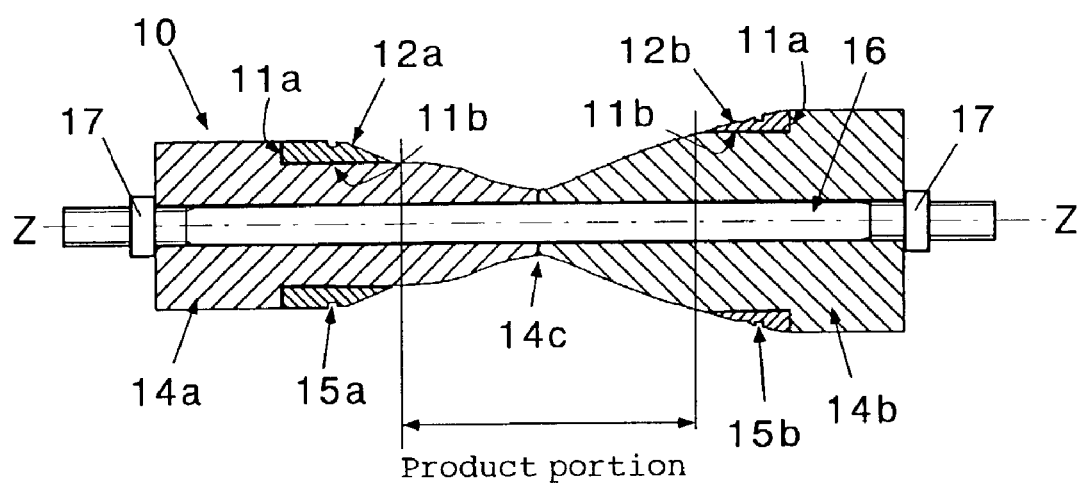
FIG. 4 is a schematic view of a mandrel constituting a manufacture apparatus of the present invention.

FIG. 4 is a schematic view of a mandrel constituting a manufacture apparatus of the present invention. As shown in FIG. 1, in a manufacturing method and apparatus of a fiber reinforced composite member of the present invention, after forming a fabric 1 on the surface of a mandrel 10, and performing a CVI treatment to form an SiC matrix layer on the surface of the formed fabric 1, a PIP treatment is performed to infiltrate a gap of the matrix layer with an organic silicon polymer as a base material and perform calcining.

In the manufacturing method and apparatus of the present invention, as shown in FIG. 4, the mandrel 10 is in a division structure constituted by a combination of reference segments 12a, 12b provided with reference surfaces 11a, 11b and other forming segments 14a, 14b. Specifically, in this example, the forming segments 14a, 14b are divided at a smallest portion 14c of a product portion, and are integrally assembled by a connecting rod 16 passed through a center portion and nuts 17 fitted to both ends of the rod.

Moreover, the end surface 11a of an axial direction of the reference segments 12a, 12b is formed to be vertical with an axial line Z—Z of a product, and forms a reference surface of an axial center during machining as described later. Furthermore, the inner surface 11b of the reference surfaces 12a, 12b is a cylindrical surface which is coaxial with the axial line Z—Z, and forms a reference surface of the axial center during machining.

The reference segments 12a, 12b are joined to each other in such a manner that there is little gap outside a cylindrical portion provided in the forming segments 14a, 14b.

Figure 5A:
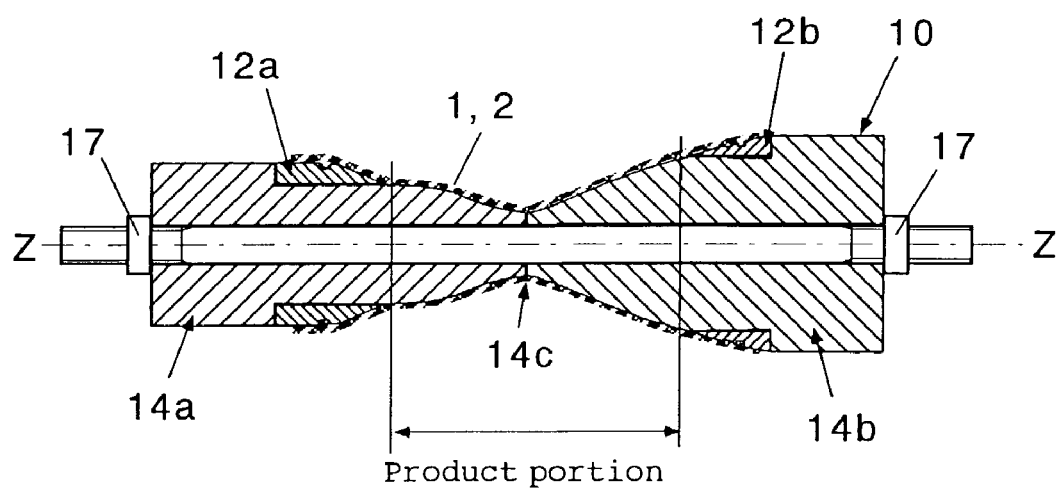
FIGS. 5A and 5B are schematic views of the manufacturing method in which a mandrel 10 of FIG. 4 is used.
Figure 5B:
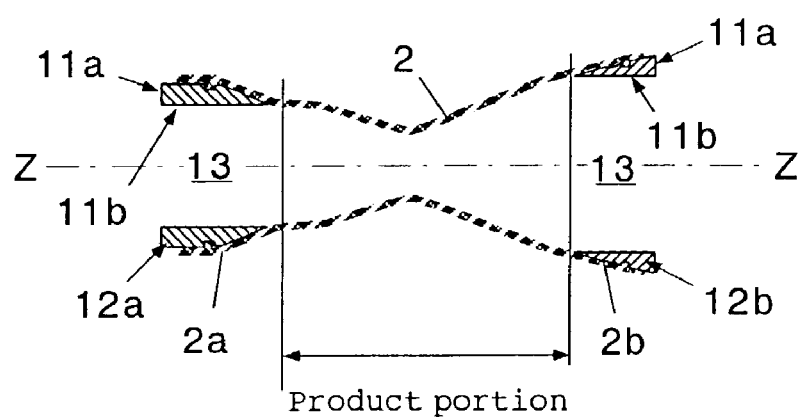

FIGS. 5A and 5B are schematic views of a manufacturing method in which the mandrel 10 of FIG. 4 is used. In the drawing, FIG. 5A shows a process of forming the fabric 1 on the surface of the mandrel 10 to a process of performing the CVI treatment to further form the SiC matrix layer on the surface of the formed fabric 1. Moreover, FIG. 5B shows a subsequent situation in which the reference segments 12a, 12b are left as integral with the fabric 1 and the forming segments 14a, 14b are removed before the PIP treatment. Machining may be performed in any stage of the CVI, PIP process. Additionally, removing of the forming segments 14a, 14b may be performed after or while the CVI treatment is performed.

As shown in FIG. 5A, connection portions 2a, 2b with a diameter larger than that of the product portion are prepared outside the product portion of a ceramic matrix composite member 2, and the connection portions may be connected to the reference segments 12a, 12b of the mandrel 10.

Moreover, the reference segments 12a, 12b are provided with a through hole 13 (corresponding to the inner surface 11b of the reference segments 12a, 12b in this example) which is concentric with the product portion and is larger in diameter than the product portion, and the forming segments 14a, 14b for forming the product portion may be constituted to be detached through this through hole.

Furthermore, as shown in FIGS. 4, 5A and 5B, the surface of the reference segments 12a, 12b may be provided with grooves 15a, 15b and protrusion to enhance connection strength with the fabric 1. For the grooves 15a, 15b, in this example, only one groove is provided in a peripheral direction. However by disposing a plurality of grooves, fiber (e.g. a braid thread) of the fabric 1 can be joined into this groove so as to reinforce connection/integration of the reference segments 12a, 12b of this portion with the ceramic matrix composite member 2. Additionally, by coating the surface of the reference segments 12a, 12b beforehand with an adhesive (e.g., a polymer solution in the PIP treatment), the grooves 15a, 15b and protrusion may be omitted.

In the method of the present invention, the mandrel 10 with the fabric 1 formed on the surface thereof is in the division structure constituted by the combination of the reference segments 12a, 12b provided with the reference surfaces 11a, 11b and other forming segments 14a, 14b. Before the fabric 1 adheres to the mandrel 10 by matrix infiltration, the reference segments 12a, 12b are left as integral with the fabric 1 and the forming segments are removed. Therefore, the product portion which fails to contact the reference segment can sufficiently be subjected to the matrix treatment similarly as the conventional art.

Moreover, since the reference segments 12a, 12b are left in the semi-finished product (ceramic matrix composite member 2) during machining, by using the reference surfaces 11a, 11b of the reference segments as machining bases (axial center and reference surface), the axial direction position and axial center determined on the mandrel can be held constant. Therefore, by setting the reference surface beforehand to be a smooth surface, even with a large concave/convex of the surface of the semi-finished product, the machining bases can correctly be provided, non-uniformity of a plate thickness after machining can be eliminated, shape precision is improved, and further strength deterioration by cutting of fiber can be inhibited.

Figure 6:
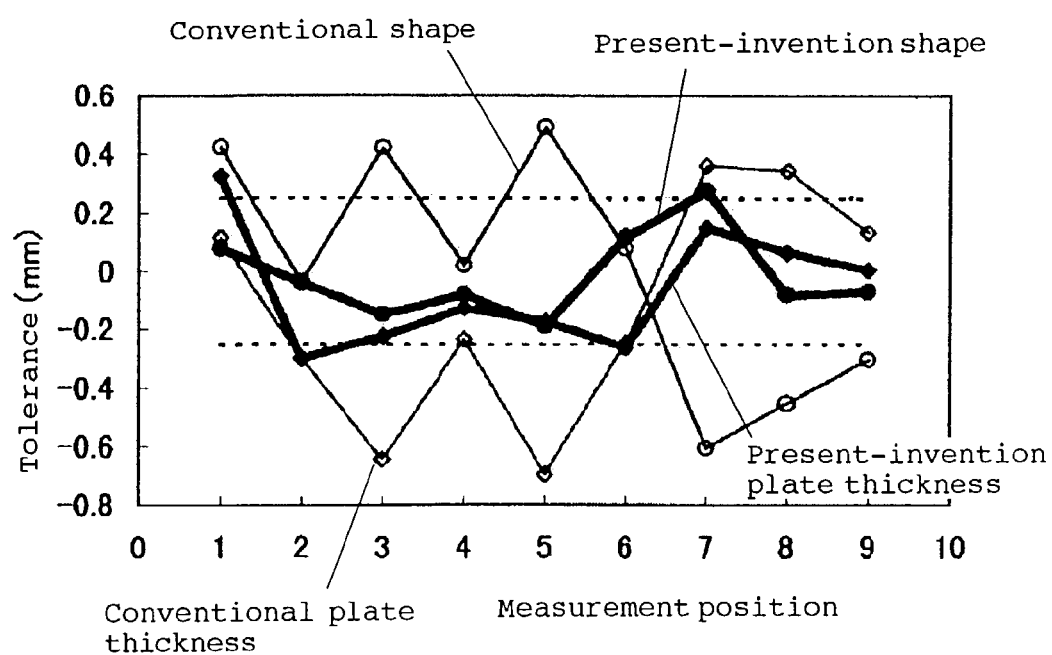
FIG. 6 is a precision comparison diagram according to an embodiment of the method of the present invention.

FIG. 6 is a precision comparison diagram according to an embodiment of the method of the present invention. In FIG. 6, the abscissa indicates the axial direction position of a manufactured thrust chamber, and the ordinate indicates tolerances of plate thickness and shape.

From this drawing, the plate thickness tolerance and shape tolerance according to the conventional method are both dispersed substantially in a range of ±0.5 mm or more, and fail to reach a target of ±0.25 mm or less. On the other hand, the plate thickness tolerance and shape tolerance according to the method of the present invention are substantially within the target of ±0.25 mm or less.

As described above, in the manufacturing method and apparatus of the present invention, the machining bases (axial center and reference surface) during machining can accurately be provided without possibility of adhesion to the mandrel and resulting breakage, so that machining precision and yield of a final product can largely be improved, and other superior effects are provided.

Additionally, the present invention is not limited to the aforementioned embodiment and can of course be modified variously without departing from the scope of the present invention. For example, in the above description, the thrust chamber or another rotary member as the product has been described in detail, but the present invention is not limited to this, and can also be applied to an arbitrary-shape fuel piping, turbine vane, combustor, afterburner component, and the like.

What is claimed is:

1. A manufacturing apparatus for forming a fiber reinforced composite member by forming a fabric on the surface of a mandrel and infiltrating the formed fabric with a matrix, comprising:

a mandrel having a length that is longer than a length of the fiber reinforced composite member, wherein the mandrel protrudes from the fiber reinforced composite member;

the mandrel further comprising an end portion having a diameter increasing toward an end of the mandrel; and the end portion is separable into (1) an annular portion having a diameter larger than an outer diameter of an end portion of the fiber reinforced composite, member, and (2) a remaining portion, wherein a groove or a protrusion interlocking with fabric is formed on the surface of the annular portion in such a manner than when a part of the mandrel forming a product portion is removed, a portion of the mandrel is left as integral with the fabric and fails to move on the fabric.

2. The apparatus according to claim 1, wherein said apparatus comprises means for forming a fabric on surface of the mandrel from the reinforced composite member.

3. The apparatus according to claim 2, wherein said apparatus further comprises means for infiltrating the fabric with a matrix.

* * * * *